(12) United States Patent
Barnett et al.

(10) Patent No.: US 12,549,355 B2
(45) Date of Patent: Feb. 10, 2026

(54) SCALABLE ASSURED DELETE WITH AONT

(71) Applicant: Dell Products L.P., Round Rock, TX (US)

(72) Inventors: Alan Barnett, County Cork (IE); Aidan O'Mahony, Cork (IE); Dale R. Bremner, Wrentham, MA (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 18/605,680

(22) Filed: Mar. 14, 2024

(65) Prior Publication Data

US 2025/0293874 A1    Sep. 18, 2025

(51) Int. Cl.
*H04L 9/08*    (2006.01)
*G06F 21/60*   (2013.01)

(52) U.S. Cl.
CPC ............ *H04L 9/088* (2013.01); *G06F 21/602* (2013.01)

(58) Field of Classification Search
CPC .............................. H04L 9/088; G06F 21/602
See application file for complete search history.

(56) References Cited

U.S. PATENT DOCUMENTS

| | | | | |
|---|---|---|---|---|
| 2007/0061265 | A1* | 3/2007 | Hovnanian | G07F 17/16 705/51 |
| 2014/0006802 | A1* | 1/2014 | Cachin | G06F 21/602 713/189 |
| 2014/0359309 | A1* | 12/2014 | Cachin | G06F 21/602 713/189 |
| 2019/0324678 | A1* | 10/2019 | Griffes | H04L 9/0891 |

OTHER PUBLICATIONS

Ramokapane, Kopo et al. "Assured Deletion in the Cloud: Requirements, Challenges and Future Directions", CCSW16, Oct. 28, 2016, Vienna, Austria, 12 Pages.
National Cyber Security Centre, "Secure Sanitisation of Storage Media", https://www.ncsc.gov.uk/guidance/secure-sanitisation-storage-media, Sep. 23, 2016, 13 Pages.
Kime, Chad, "Data Deletion Methods: What's Best for Sensitive Data?", https://www.esecurityplanet.com/compliance/data-deletion-methods-for-sensitive-data/, Mar. 18, 2022, 6 pages.

* cited by examiner

*Primary Examiner* — Matthew T Henning
(74) *Attorney, Agent, or Firm* — Workman Nydegger

(57) ABSTRACT

One example method includes identifying a dataset, which may be a backup dataset, that has been subjected to a mix&slice process, identifying a cryptographic key that was used to encrypt the dataset, randomly selecting, from the backup dataset, a portion of the dataset, randomly applying writes to the portion of the dataset, and deleting the cryptographic key. The dataset cannot be recovered without both the cryptographic key, and the portion of the dataset to which the writes were randomly applied.

20 Claims, 3 Drawing Sheets

SCALABLE ASSURED DELETE WITH AONT

FIELD OF THE INVENTION

Embodiments of the present invention generally relate to data security. More particularly, at least some embodiments of the invention relate to systems, hardware, software, computer-readable media, and methods, for implementing security of backed up data.

BACKGROUND

Scalable Assured Delete (SAD) is a data sanitization technique used in storage systems to ensure that deleted data is irrecoverable and cannot be accessed by unauthorized parties. In addition, scalable assured delete can encrypt many files with the same key. When the key is deleted, every file that was encrypted with that key cannot be decrypted. The problem that scalable assured delete is trying to solve is the risk of data breaches and unauthorized access to sensitive or confidential data that may occur even after the data is deleted from storage systems.

Current approaches to protection of deleted data are vulnerable along at least two vectors, namely, everyday risks, and malicious users. As to the first, these includes everyday risks stemming from storage and backup technologies. A minor mistake could result in data, which was supposed to have been deleted, actually remaining in storage somewhere, for example an eventually consistent backup store. Scenarios can occur where scalable assured deletion of a file is carried out, but an employee then restores a backup, for whatever reason, soon after the deletion, but before the backup has become consistent with the primary storage block and been able to synchronize the deletion. This could result in files, which should have been deleted, still being present on storage. While scalable assured delete destroys the key, the same can be said for the key management systems regarding backups and fault tolerance—it is unusual for a key management system to operate without these extra guards against faults.

Another problem with conventional approaches is that when data is deleted from a storage system using standard deletion methods, the data is not immediately erased from the physical storage media, and may still be recoverable using specialized recovery tools or techniques. This presents a risk that unauthorized parties may be able to access and recover deleted data, which can lead to data breaches and compromise the confidentiality, integrity, and availability of the data. This relates to any deleted data, and can be true for files, cryptographic keys, and more. Furthermore, in relation to scalable assured deletion, there exists a risk of collusion, where an attacker can retrieve the key from a backup provider even after key deletion. Collusion is not necessary if the attacker can somehow obtain the key otherwise, such as via abuse or breaching, though this is highly unlikely given that the attacker must also breach the location on which the data is stored.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
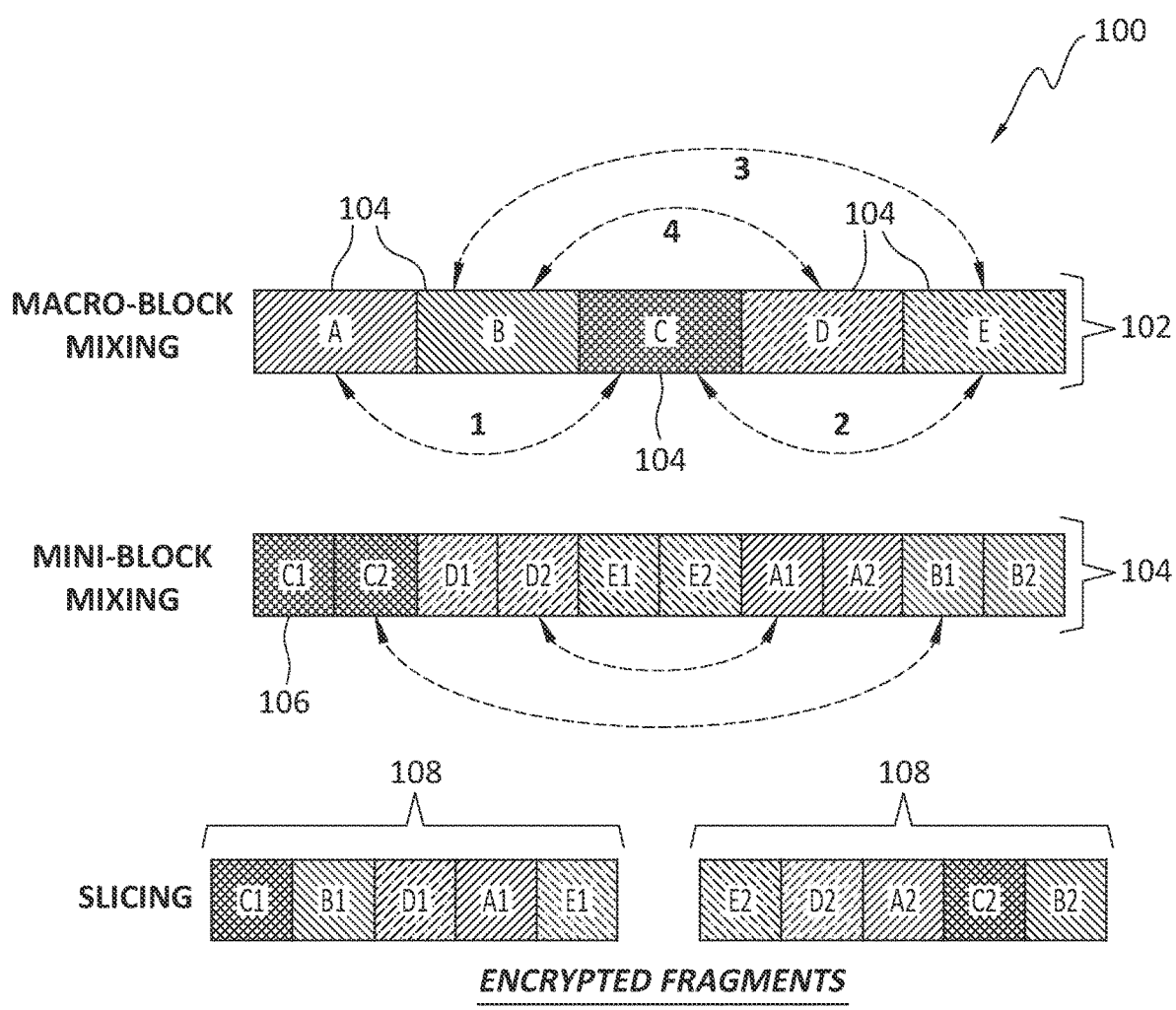
FIG. 1 discloses aspects of an example mix and slice operation.

Embodiments of the present invention generally relate to data security. More particularly, at least some embodiments of the invention relate to systems, hardware, software, computer-readable media, and methods, for implementing security of backed up data.

One example embodiment comprises a method for implementing security with regard to backed up data. One example of such a method comprises the operations: identifying a dataset that is to be deleted; identifying a cryptographic key associated with the dataset; randomly selecting, from the dataset, a macro-block for deletion; applying a series of writes of random patterns to the macro-block; and, deleting the cryptographic key.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that deleted data cannot be recovered without the use of multiple different elements. An embodiment may comprise the application of multiple layers of protection to a set of deleted data. Various other advantageous aspects of one or more example embodiments will be apparent from this disclosure.

A. Aspects of an Example Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview of Aspects of an Example Embodiment

Storing files securely in the cloud or on an on-premises storage system, for example, is imperative for some entities and circumstances. However, it is also important to remove those files safely when they are no longer needed, so as to reduce the size of a cyber-attack surface of the organization. Simply deleting files at the operating system level is not secure as the file storage is only marked for overwriting and the file data can potentially be recovered until it is overwritten. Encrypting the file data and deleting the encryption key at the time of file deletion increases security but if the key is recovered, from a previously created copy or a restored backup for example, the file data itself could be recovered. Thus, an example embodiment includes, among other protective mechanisms, splitting the file into fragments, each of which contain data from all the other fragments, and erasing a single fragment at the time of file deletion. The file can then no longer be recovered since all fragments are required for decryption.

C. Detailed Discussion of Aspects of an Example Embodiment

C.1 Introduction

An example embodiment comprises a more secure version of the 'scalable assured delete' (SAD) method by combining that method with an AONT (all-or-nothing transform) cryptosystem. The result of this is an approach that is more secure and effective than either of these approaches would be on its own. In an embodiment, an attacker would need both (1) the key and (2) the entirety of the ciphertext, in order to be able to compromise data, as decrypting partial ciphertext encrypted under an AONT cryptosystem is virtually impossible.

Scalable assured delete (SAD) is a data sanitization technique used in storage systems to ensure that deleted data is irrecoverable and cannot be accessed by unauthorized parties. In addition, scalable assured delete can encrypt many files with the same key. When the key is deleted, every file that was encrypted with that key cannot be decrypted.

All-or-nothing transforms (AONT) provide an encrypted representation of an input and creates a full interdependency between the bits of that input, such that the output can only be decrypted in its entirety. Thus, a single missing data artifact makes decryption of the rest of the data artifacts impossible.

C.2 Discussion

SAD renders one or more files unusable at a particular time in the future by deleting the key that was used to encrypt the files. However, if the key is somehow recovered, from the restoration of a backup for example, then the files would become "undeleted" and, therefore, accessible. Thus, an embodiment provides for deleting an AONT fragment of one or more files at the expiration time of the files, which would protect against the possibility of the original key being recovered, while only imposing a small increase in overhead on the delete process.

A component of one embodiment is the all-or-nothing transform library. In one embodiment, this all-or-nothing transform library may comprise the publicly available "aes-mix" (Mix&Slice (MS) Encryption) library, but another comparable library could be used.

The library itself may be integrated into a program or code project similarly to a contemporary cryptographic library. It is noted, regarding AES (Advanced Encryption Standard) operating in Mix&Slice mode, is that AES is not significantly less efficient, in terms of processing time/speed, than AES running in a more commonplace encryption mode. Another point to note is that if an attacker possesses all AONT Mix&Slice fragments of a given ciphertext, but does not possess the key to the encrypted fragments, then AES Mix&Slice encryption is as difficult to break as standard AES encryption of the same key size. If a single fragment is missing, it becomes orders of magnitude more difficult to break.

One embodiment thus comprises a combination of (1) the AONT AES Mix&Slice and (2) the SAD, to improve the security of deleted data, such as in a server/cloud file storage use case for example. In an embodiment, the AONT employed is AES Mix&Slice encryption mode, in which the input is mixed to establish bit interdependency, and the mixture is then sliced into sections to produce multiple fragments that are both encrypted, and interdependent with each other.

In such an embodiment, when the encryption key is deleted on a key management system, and an AES Mix&Slice fragment is deleted on the data storage, a need is created for an attacker to recover both (1) the key to decrypt the data, and (2) the missing fragment to complete the AONT set, or some kind of collusion is otherwise required between, for example, a CSP (cloud service provider) such as a cloud data storage site, and a KMIP (key management interoperability protocol) provider. This is based on the assertion that the key, the data, and the single removed fragment, are all deleted in such a way that they are sent to different "deletion heaps," as it may negatively impact the security provided by one embodiment for one, or more, of these to be placed in the same deletion heap.

With reference now to FIG. 1, an example mix and slice protocol scheme is disclosed that may be employed in one embodiment. The discussion of the example embodiment of FIG. 1 may refer to portions of data such as blocks, macro-blocks, and mini-blocks. As used herein, a 'block' may comprise a sequence of bits that may be input to a block cipher, a 'mini-block' may refer to a sequence of bits, of a specified length, contained in a block, and a 'macro-block' may refer simply to a sequence of blocks.

The mix and slice scheme 100 of FIG. 1 may be performed in order to achieve an AONT result. As shown in FIG. 1, a block 102, which may be randomly selected from backed up data and may comprise plaintext for example, may comprise a group of macro-blocks 104, five in the illustrated example. The macro-blocks 104 may be mixed up, such as in terms of their order or arrangement within the block 102, as shown. For example, block A 104 and block C 104 may swap positions (1). The, block C 104 and block E 104 may swap positions (2). Further, block E 104 and block B 104 may swap positions (3). Finally, block B 104 and block D 104 may swap positions.

As further indicated in FIG. 1, one or more of the macro-blocks 104 may be further subdivided into a group of mini-blocks 106, which may then be mixed together. In this example, the mixture of the mini-blocks 106 is then sliced into equally sized fragments 108, each of which possesses data from all macro-blocks 102 which comprised the original input data. After the fragments 108 have been created, they may be encrypted.

It is noted that the mix and slice scheme disclosed in FIG. 1 is presented only by way of example, and the scope of the invention is not limited to that example. More generally, other schemes that mix up data in some way may alternatively be used in an embodiment.

D. Example Methods

Figure 2:
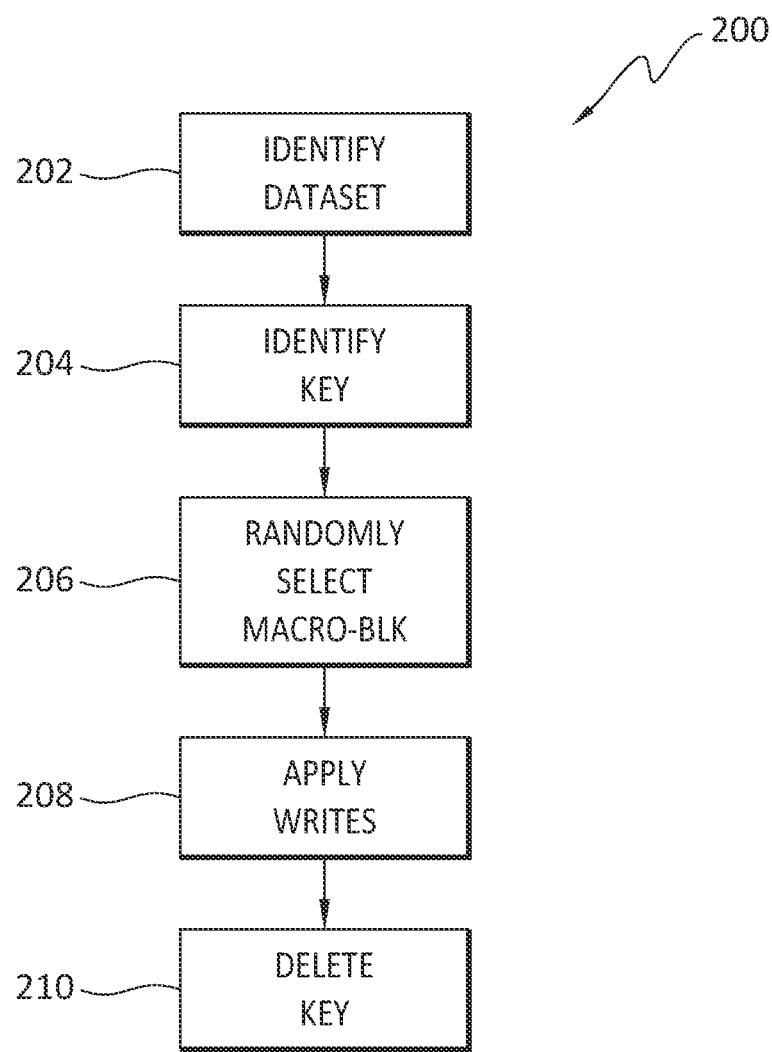
FIG. 2 discloses aspects of a method according to one example embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to one embodiment is denoted at 200. In an embodiment, part or all of the method 200 may be performed by, and/or at the direction of, a data protection application, such as a backup application for example. As such, an application that performs the method 200 may be hosted, for example, at a data protection site, such as a cloud storage site for example, or on premises at a customer site. No particular entity is required to perform the method 200 however, nor is the method 200 required to be performed at any particular site.

In an embodiment, the example method 200 may begin with the identification 202 of a dataset, such as a backup dataset for example, that is to be deleted. In an embodiment, the selected backup dataset may have already been subjected to a mix&slice operation prior to the identification 202 having been performed.

Next, the cryptographic key associated with the identified 202 dataset may be identified 204. In an embodiment, this cryptographic key is the key that was used to encrypt the identified dataset 202, and may also be usable to decrypt the identified dataset.

A macro-block may be randomly selected 206, from the identified dataset 202, for deletion. Because the dataset may, as noted above, have been subjected to a mix&slice operation, the selected 206 macro-block may reflect the performance of that mix&slice operation. That is, the macro-block may include one or more blocks that are not only interdependent with one or more other blocks of the dataset, but have also been encrypted using the encryption key.

In an embodiment, the ciphertext, or plaintext if the dataset has not been encrypted, as applicable, of the dataset may be divided into many macro-blocks, one, some, or all, of which may subsequently be subdivided into mini-blocks, as in the example of FIG. 1. Further, the operation 206 need not necessarily be applied to a macro-block. For example, the operation 206 may be applied to a mini-block of the dataset, or even to a single fragment of the dataset, depending upon the scope of the deletion to be achieved.

Once a portion of data, whether that portion be a macro-block, mini-block, fragment, or other portion of data, has been randomly selected 206, a series of random patterns may be applied 208 to that portion of data. For example, the operation 208 may comprise the Gutmann method for erasing data. However, no particular method or technique need be applied. As a result of the operation 208. The portion of data that was selected 206 may be erased.

Finally, the cryptographic key may be deleted 210. Thus, in order to be able to gain access to the dataset, a bad actor would have to recover not only the data portion that was deleted as a result of the operation 208, but the bad actor would then also have to recover the cryptographic key, since mere recovery of the deleted data portion is not enough to enable the bad actor to access the data of the dataset.

E. Further Discussion

As will be apparent from this disclosure, one or more embodiments may possess various useful features and aspects, although no embodiment is required to possess any of such features and aspects. The following examples are illustrative, but not exhaustive.

An embodiment may comprise a combination of (1) an AONT AES Mix&Slice secure deletion and (2) scalable assured delete together, that collectively form an effective and efficient approach to deletion of data that renders the deleted data difficult, if not impossible, for a bad actor to recover. Moreover, this combination may provide a more secure method of handling deleted data than is possible with either of the two components alone. This may be due to the efficiency of AES operating in Mix&Slice cryptography mode being comparable in efficiency to AES operating in other, more standard cryptography modes. The two solutions synergize well and operate in a way in which they complement each other.

As another example, in an embodiment, the deleted material, which may comprise an encrypted portion of a dataset that has been subjected to a mix& slice operation, and the remainder of the dataset, may be sent to different respective deletion heaps to further increase protection against the recovery of any of the deleted data. In one embodiment, this may be done by moving single encrypted fragment of the deleted data to a separate deletion heap from the deletion heap to which the remainder of the deleted data is sent, which may incur only a nominal computing cost. That is, when using AES Mix&Slice in an embodiment, every encrypted fragment pertaining to a given ciphertext is obtained in order to reduce the cryptographic hardness of that ciphertext back to a level comparable with regular AES. Additionally, or alternatively, key material deleted from a KMIP server may also be effectively guaranteed to end up in a different deletion heap than the material deleted from the storage node. The ability to take advantage of multiple deletion heaps to increase protection, in an efficient manner, is another example aspect that may be implemented in an embodiment.

F. Aspects of Some Example Use Cases

This disclosure how various example embodiments may operate, and some technologies and systems in which one or more of such embodiments may be effective. The following illustrative examples expand on the problem space by introducing real-world scenarios, to which one or more embodiments may be applied.

The first example concerns a real-world example involving a cyber-attack. In this example, the company in question has multiple revenue streams, ranging from hardware, to videogames, to the movies industry. Prior to the release, in 2014, of one of the movies owned by the company, a cyberattack was carried out against the company. The attack was initially unable to breach the main systems of the company to access the movie files. However, the backup storage was successfully breached. The attackers placed their malicious programs on the backup storage, then carried out an intelligent ruse. In particular, a blatant cyber attack was carried out against the primary systems of the company, with the aim of it being highly visible in order to provoke a reaction. The company fell into the trap of pulling down, that is, restoring, their backups once the cyber-attack had ended, with the objective of refreshing any possibly infected machines with a clean restore-point. However, the images which were pulled down and installed across the primary systems of the entire company, were already infected as a result of the initial cyberattack, causing a massive impact and allowing the attackers to gain access to the video files for the unreleased movie and publish them, causing further financial damage. In this attack, the attackers showed a deeper understanding of backup procedures, and security policies, and were able to trigger a system-wide backup. However, had an embodiment of the invention been implemented by the company, this attack would likely have failed. In any case, this example illustrates one attack vector that bad actors may try to exploit with respect to backups.

As noted herein, an example embodiment may provide for improved protection against recovery of deleted material. Thus, the next example outlines a method of carrying out an attack which can recover deleted data, and deleted cryptographic keys. In one particular scenario, block cipher keys have been recovered in an experimental environment using a "cold boot attack." In this scenario, an attack obtains a "noisy" version of a cryptographic key via a cold boot attack, then applies algorithms such as Grover's and key enumeration algorithms. Some methods can do this with the ability to tolerate as much as 40% noise, and still recover the key. The cold boot attack is a form of side channel attack which attempts to target implementation vulnerabilities of cryptographic schemes by capturing vital data from an electronic system or the main memory of a device—after the data was supposedly deleted. The dynamic RAM data remanence property is exploited here, which in simple terms refers to deletion which operates in a way that allocates memory as "free" and to be overwritten, but the data within is not actually deleted until the overwrite occurs, which can be some time. An embodiment may blunt such an attack however, inasmuch as, in an embodiment, some of the deleted data may randomly overwritten, as described in the discussion of FIG. 2 above.

G. Further Example Embodiments

Following are some further example embodiments of the invention. These are presented only by way of example and are not intended to limit the scope of the invention in any way.

Embodiment 1. A method, comprising: identifying a dataset that has been subjected to a mix&slice process; identifying a cryptographic key that was used to encrypt the dataset; randomly selecting, from the dataset, a portion of the dataset; randomly applying writes to the portion of the dataset; and deleting the cryptographic key.

Embodiment 2. The method as recited in any preceding embodiment, wherein the portion of the dataset comprises data that is bit-interdependent with another portion of the dataset, and the portion of the dataset was encrypted with the cryptographic key after establishment of the interdependency.

Embodiment 3. The method as recited in any preceding embodiment, wherein randomly applying the writes effectively deletes the portion of the dataset to which the writes were applied.

Embodiment 4. The method as recited in any preceding embodiment, wherein the portion of the dataset comprises any of: a macro-block; a mini-block; or a fragment.

Embodiment 5. The method as recited in any preceding embodiment, wherein the mix&slice process comprises either mixing of macro-blocks of the dataset, or mixing mini-blocks of the dataset, and then slicing the mixed macro-blocks, or the mixed mini-blocks, to obtain encrypted fragments of the dataset, and the portion of the dataset comprises one of the encrypted fragments.

Embodiment 6. The method as recited in any preceding embodiment, wherein randomly applying writes to the portion of the dataset comprises applying the Gutmann method to the portion of the dataset to erase the portion of the dataset.

Embodiment 7. The method as recited in any preceding embodiment, wherein data of the dataset cannot be recovered without both the cryptographic key and the portion of the dataset to which the writes were randomly applied.

Embodiment 8. The method as recited in any preceding embodiment, wherein the portion of the dataset is sent to a first deletion heap, and a remainder of the dataset is sent to a second deletion heap that is separate from the first deletion heap.

Embodiment 9. The method as recited in any preceding embodiment, wherein the dataset is a backup dataset.

Embodiment 10. The method as recited in any preceding embodiment, wherein the dataset resides at a cloud data storage site.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
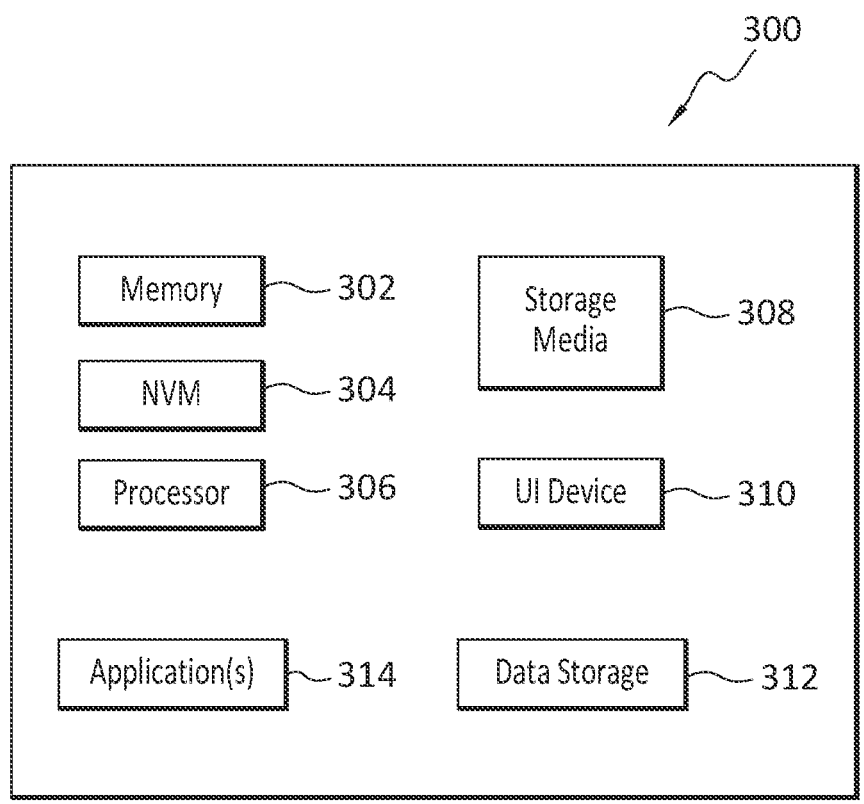
FIG. 3 discloses aspects of an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   identifying a dataset that has been subjected to a mix&slice process;
   identifying a cryptographic key that was used to encrypt the dataset;
   randomly selecting, from the dataset, a portion of the dataset;
   randomly applying writes to the portion of the dataset; and
   deleting the cryptographic key.

2. The method as recited in claim 1, wherein the portion of the dataset comprises data that is bit-interdependent with another portion of the dataset, and the portion of the dataset was encrypted with the cryptographic key after establishment of the interdependency.

3. The method as recited in claim 1, wherein randomly applying the writes effectively deletes the portion of the dataset to which the writes were applied.

4. The method as recited in claim 1, wherein the portion of the dataset comprises any of: a macro-block; a mini-block; or a fragment.

5. The method as recited in claim 1, wherein the mix&slice process comprises either mixing of macro-blocks of the dataset, or mixing mini-blocks of the dataset, and then slicing the mixed macro-blocks, or the mixed mini-blocks, to obtain encrypted fragments of the dataset, and the portion of the dataset comprises one of the encrypted fragments.

6. The method as recited in claim 1, wherein randomly applying writes to the portion of the dataset comprises applying the Gutmann method to the portion of the dataset to erase the portion of the dataset.

7. The method as recited in claim 1, wherein data of the dataset cannot be recovered without both the cryptographic key and the portion of the dataset to which the writes were randomly applied.

8. The method as recited in claim 1, wherein the portion of the dataset is sent to a first deletion heap, and a remainder of the dataset is sent to a second deletion heap that is separate from the first deletion heap.

9. The method as recited in claim 1, wherein the dataset is a backup dataset.

10. The method as recited in claim 1, wherein the dataset resides at a cloud data storage site.

11. A non-transitory storage medium having stored therein instructions that are executable by one or more hardware processors to perform operations comprising:
    identifying a dataset that has been subjected to a mix&slice process;
    identifying a cryptographic key that was used to encrypt the dataset;
    randomly selecting, from the dataset, a portion of the dataset;
    randomly applying writes to the portion of the dataset; and
    deleting the cryptographic key.

12. The non-transitory storage medium as recited in claim 11, wherein the portion of the dataset comprises data that is bit-interdependent with another portion of the dataset, and the portion of the dataset was encrypted with the cryptographic key after establishment of the interdependency.

13. The non-transitory storage medium as recited in claim 11, wherein randomly applying the writes effectively deletes the portion of the dataset to which the writes were applied.

14. The non-transitory storage medium as recited in claim 11, wherein the portion of the dataset comprises any of: a macro-block; a mini-block; or a fragment.

15. The non-transitory storage medium as recited in claim 11, wherein the mix&slice process comprises either mixing of macro-blocks of the dataset, or mixing mini-blocks of the dataset, and then slicing the mixed macro-blocks, or the mixed mini-blocks, to obtain encrypted fragments of the dataset, and the portion of the dataset comprises one of the encrypted fragments.

16. The non-transitory storage medium as recited in claim 11, wherein randomly applying writes to the portion of the dataset comprises applying the Gutmann method to the portion of the dataset to erase the portion of the dataset.

17. The non-transitory storage medium as recited in claim 11, wherein data of the dataset cannot be recovered without both the cryptographic key and the portion of the dataset to which the writes were randomly applied.

18. The non-transitory storage medium as recited in claim 11, wherein the portion of the dataset is sent to a first deletion heap, and a remainder of the dataset is sent to a second deletion heap that is separate from the first deletion heap.

19. The non-transitory storage medium as recited in claim 11, wherein the dataset is a backup dataset.

20. The non-transitory storage medium as recited in claim 11, wherein the dataset resides at a cloud data storage site.

* * * * *